(12) United States Patent
Harvey et al.

(10) Patent No.: US 7,069,512 B2
(45) Date of Patent: Jun. 27, 2006

(54) COMMAND LINE INTERFACE WITH INDICATION OF NETWORK ELEMENT STATUS

(75) Inventors: Scott Michael Harvey, Wake Forest, NC (US); Robert Leroy Lynch, Raleigh, NC (US); Prayson Will Pate, Durham, NC (US)

(73) Assignee: Overture Networks, Inc., Morrisville, NC (US)

( * ) Notice: Subject to any disclaimer, the term of this patent is extended or adjusted under 35 U.S.C. 154(b) by 836 days.

(21) Appl. No.: 10/266,909

(22) Filed: Oct. 8, 2002

(65) Prior Publication Data
US 2004/0066400 A1    Apr. 8, 2004

(51) Int. Cl.
G06F 17/00    (2006.01)
G06F 3/00    (2006.01)

(52) U.S. Cl. ............. 715/736; 715/733; 715/734; 715/735; 715/764; 715/780; 715/809; 709/223; 709/224; 714/48

(58) Field of Classification Search ........ 715/733–736, 715/764, 780, 809; 709/223, 224; 714/48
See application file for complete search history.

(56) References Cited

U.S. PATENT DOCUMENTS

| | | | | |
|---|---|---|---|---|
| 5,751,965 A | * | 5/1998 | Mayo et al. | 709/224 |
| 6,000,045 A | * | 12/1999 | Lewis | 714/47 |
| 6,006,016 A | * | 12/1999 | Faigon et al. | 714/48 |
| 6,108,309 A | * | 8/2000 | Cohoe et al. | 370/241 |
| 6,219,708 B1 | * | 4/2001 | Martenson | 709/226 |
| 6,513,129 B1 | * | 1/2003 | Tentij et al. | 714/4 |
| 6,625,590 B1 | * | 9/2003 | Chen et al. | 707/1 |
| 6,704,874 B1 | * | 3/2004 | Porras et al. | 726/22 |

OTHER PUBLICATIONS

ViewRunner for HP OpenView Overview, Documentation, Oct., 8, 1999, Cisco Systems Inc., pp. 1-3, 38-41, http://www.cisco.com/univercd/cc/td/doc/product/dsl_prod/vrmgtsw/vr4ov/rel235/vrovpo/04ch01.htm.*

Java, IPTraf User's Manual, May 19, 2002, Gerard Paul Java, http://iptraf.seul.org/2.7/manual.html, Sections—Table of Contents, Copyright, About This Document, Getting Started, Command-line Options, Network Interface Statistics, Detailed Interface Statistics.*

Web pages printed on Nov. 19, 2002 from LinuxLookup.com entitled Shell Prompt Customization, 6 pages (Nov. 28, 2000) http://www.linuxlookup.com/html/articles/custom-prompts.html.

* cited by examiner

*Primary Examiner*—Tadesse Hailu
*Assistant Examiner*—Alvin Tan
(74) *Attorney, Agent, or Firm*—The Eclipse Group LLP; Kevin E. Flynn

(57) ABSTRACT

A method of providing an ongoing indication of at least one piece of current status information about a network element through the use of status indicators in the command line prompt displayed on a command line interface display monitor. Optionally, the pop-up messages to the command line interface display monitor can be modified to provide an indicator of network element status. This abstract is provided as a tool for those searching for patents, and not as a limitation on the scope of the claims.

17 Claims, 3 Drawing Sheets

192.168.1.134  Tue Sep 24 16:03:31 2002  ⎫
    Major fault event on Slot 4 port 1       ⎬ 116
       Loss of Signal (LOS)                  ⎭

```
  100               120
┌──┴──┐         ┌───┴────┐
192.168.1.134#  slot show cards Slot  Card Type    ASIC Version    S/N                      ⎫
1     GIGE         N/A             5003-01FL48000015        ⎪
2     DS3old       1               5012-02FL08000000        ⎬ 124
3     10/100       N/A             5001-01FL49000013        ⎪
4     T1/E1        30              5002-01FL52000001        ⎭

100
┌──┴──┐
192.168.1.134#

-----------------------------------------------------      ⎫
                                                           ⎬ 130
System Name=129.168.1.134    Status=OK                     ⎭
```

Figure 6

```
                100           104
              ⌒‾‾‾‾⌒       ⌒‾‾‾‾⌒
          192.168.1.134#  fault show Critical      Major       Minor  ⎫
              --------      -----       -----  ⎬ 108
                  0           0           0    ⎭

**   192.168.1.134 Tue Sep 24 16:03:31 2002  ⎫
                 Major fault event on Slot 4 port 1    ⎬ 118
                   Loss of Signal (LOS)                ⎭
                     101              105
              ⌒‾‾‾‾‾‾‾‾‾‾‾‾‾⌒   ⌒‾‾‾‾⌒
          ⌒134⌒
              ⌒‾‾⌒
          **:192.168.1.134# fault show
                                                       ⎫
                                                       ⎪
              Critical      Major       Minor          ⎪
              --------      -----       -----          ⎪
                  0           1           0            ⎪
                                                       ⎬ 110
          Tue Sep 24 16:03:31 2002                     ⎪
            Major fault event on Slot 4 port 1         ⎪
              Loss of Signal (LOS)                     ⎭
```

COMMAND LINE INTERFACE WITH INDICATION OF NETWORK ELEMENT STATUS

FIELD OF THE INVENTION

This invention relates to the monitoring of network elements in a communications network.

BACKGROUND OF THE INVENTION

Operation of a CLI

As illustrated in FIG. 1, network elements typically have a text-only command line interface (CLI) that may be used for configuration and monitoring. A CLI shows the operator a prompt 100, and the operator may enter commands to cause the network element to perform various actions.

A typical CLI command 104 and response 108 is shown in FIG. 2. For example, the operator may type commands into the CLI to cause it to display alarm and status information.

The CLI is displayed in a window of fixed dimensions. Typically, as new text is displayed older commands and other displayed information move up the screen until they scroll of the top. (The invention described below is agnostic on the direction of scroll and would work fine for a system that adds new text to the top of the screen and scrolls older text off the bottom of the screen).

FIG. 3 shows the status of the screen previously shown in FIG. 2 after an operator hit the return key (at 112). Hitting enter caused the system to display a new command line prompt. When this prompt was added, the FIG. 2 prompt 100 and operator-entered command 104 has scrolled off the top of the display in FIG. 3.

Indication of Status

As shown in FIG. 2, the operator may enter a command 104 (e.g. "fault show") and see in response a summary of the current faults. However, the operator does not have an indication that there is a fault until the appropriate command is entered. Since the operator is usually monitoring a great number of network elements, it is not practical for the operator to iteratively poll each of the network elements to see if a fault exists.

As illustrated in FIG. 4, some systems display a pop-up message 116 on the screen when an event of interest occurs. This pop-up message is delivered to the display screen without a request from the operator. Note that the pop-up message 116 will eventually scroll off the screen. Also, the pop-up message will be lost if no terminal was attached to the relevant network element at the time of the event. If a series of faults occur in close succession, then a series of pop-up messages will appear on the screen with the most recent pop-up messages pushing off all but the most recent pop-up messages.

As shown in FIG. 5, some monitoring systems for network elements use special escape code to move the cursor around the Cathode Ray Tube (CRT). These systems "freeze" part of the screen and use the frozen (non-scrolling) portion 130 of the screen to display status, while the rest of the screen continues to scroll and is used for the usual Command Line Interface. Thus, command prompts 100, operator command 120, and system response 124 will scroll in the upper section of the window.

In other words, in FIG. 5, the part of the display below the dashed line is the frozen portion 130 and does not scroll. The text "Status=OK" would be replaced by "Status=Fault" when a fault occurs. While this system is superior to systems that scroll the entire screen, the "freezing" of a portion of the screen has its own drawbacks:

The frozen portion is not available for the display of other information

Freezing requires special escape codes that vary from display to display.

Freezing interferes with the capture of the display into a log file.

Freezing can lead to extended periods of displaying the same text in the same location, which can be detrimental to certain legacy displays.

Another way to quickly communicate network element status is via indicator lamps or LEDs. However, the use of indicators requires that the operator to be physically in the presence of the equipment. As described in more detail below, a system that relies on the operator to be in proximity with the network element is not useable in many applications.

Operational Scenarios

The following issues complicate the operation of network elements:

1. A network element will typically be one of many network elements in a network.
2. The network elements are often dispersed geographically.
3. A small number of operators will normally be monitoring a large number of network elements.
4. An issue or fault with a network element will typically affect a large number of users, so it is imperative that an operator must quickly become aware of the most severe network problems in order to diagnose and resolve any faults or issues in the network.
5. An operator may not be aware that an issue has occurred, but needs to be informed in a timely fashion.
6. The notification of the operator needs to continue as a reminder of an unresolved issue until the issue is resolved.

Issues 1 and 2 mean that it is not practical to have a terminal attached to each network element. Rather, the TELNET protocol, IETF RFC 854, (or other suitable protocol) is used to provide a virtual connection, and the output of this connection is captured to a file for post-mortem analysis. A CLI with a frozen status area (as shown in FIG. 5) is not acceptable when logging is being performed.

Issues 3 and 4 mean that the operator must be able to quickly focus on a given network element and determine its operational status. Any hints or shortcuts provided by the network element are invaluable in leading the network operator to the most critical faults.

Issue 5 refers to the fact than an operator may be using a system without knowing a system failure has occurred, and only discovers that something is amiss when a customer complains or an operation fails. Once the operator is notified of a failure, he then conducts a lengthy search through different status displays to determine the failure reason. This sequence of steps has the potential to cause extended service outages and customer dissatisfaction.

Thus, despite the longstanding need for such a solution, the prior art has not adequately satisfied the need to provide a quick and ongoing indication of the status of a network element to an operator monitoring the status of a network element.

It is therefore an object of the invention to provide a quick and intuitive indication of network element status such as whether the network element is currently experiencing a fault condition.

It is a further object of this invention to provide such an indication of network element status through use of a system of indications that can be implemented without knowledge of the specific terminal type for the display screen used to monitor the network element or the use of escape codes.

It is a further object of this invention to provide such an indication of network element status through use of a system of indications that can be implemented without interference to a system that creates a log file of the information sent to the display monitor.

SUMMARY

The current invention provides a succinct summary of one or more aspects of the current system status for a particular network element, which is always presented to the operator. As the network status indicator is repeated with each command line prompt, the scrolling of the display screen does not make the network status indication unavailable to the operator, and thus serves as an ongoing reminder of the status of this particular network element. The benefits include reduced operating expenses and improved response time to system faults.

These and other advantages of the present invention are apparent from the drawings and the detailed description that follows.

BRIEF DESCRIPTION OF THE DRAWINGS

FIG. 4 shows a CLI with a pop-up message in keeping with the prior art.

FIG. 5 shows a CLI with a stationary status area in keeping with the prior art.

FIG. 6 shows one variation of the simple status indication of the current invention.

DESCRIPTION

The present invention will now be described more fully hereinafter with reference to the accompanying drawings, in order that preferred embodiments of the invention can be disclosed.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
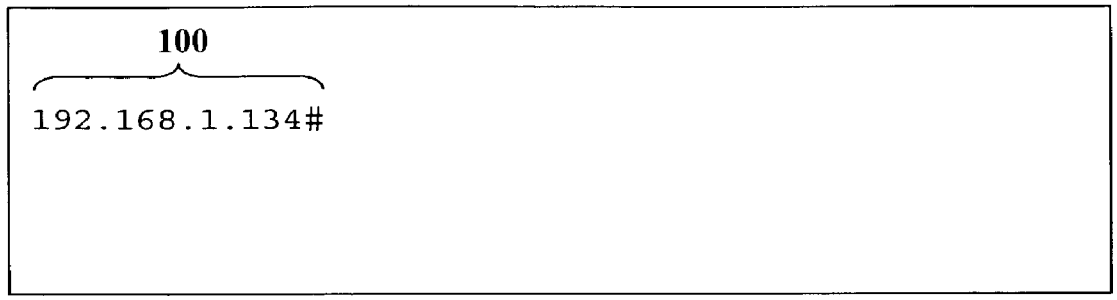
FIG. 1 shows a typical CLI prompt of the type found in the prior art.
Figure 2:
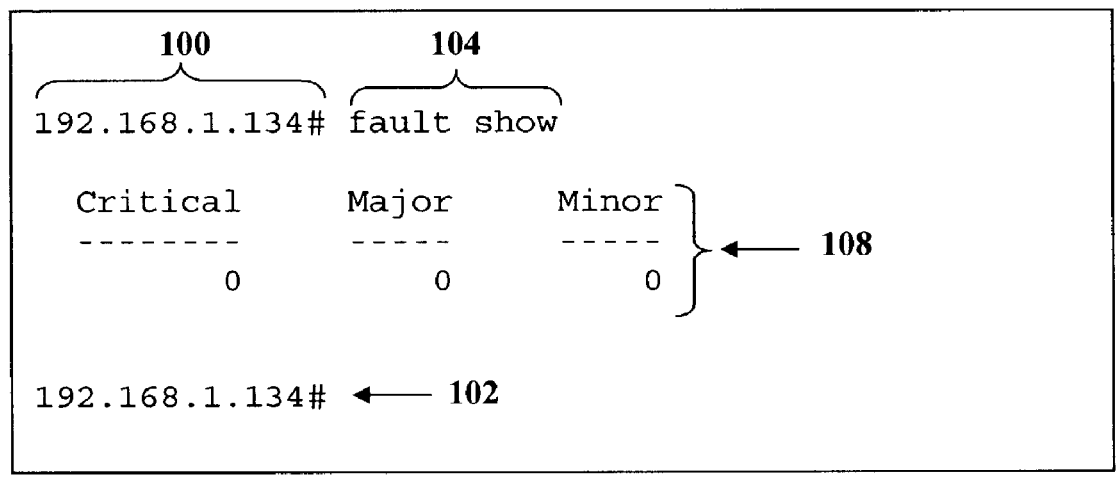
FIG. 2 shows the response of a network element to an operator command in keeping with the prior art.
Figure 3:
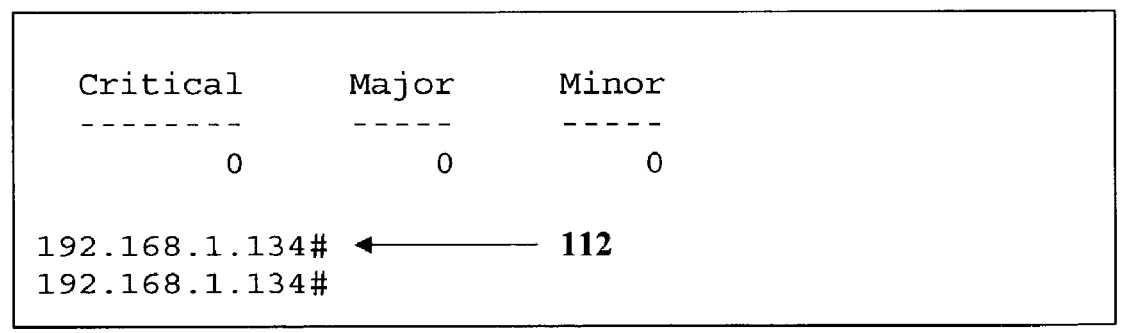
FIG. 3 shows old text scrolling off the top of a CRT in keeping with the prior art.

The invention indicates the status of a network element by changing the CLI prompt based on the status of the network element. FIG. 6 shows an example. When the response 108 to command 104 was written to the screen, the network element had no detected faults. Subsequently, a fault was detected and reported through a pop-up message 118. After the detection of a fault, the command line prompt changes. This is in contrast with the lack of change between command line prompt 100 and command line prompt 102 shown in FIG. 2. In this particular embodiment the command line prompt 101 includes a status prefix 134. In the following case the status prefix 134 is a "\*". (This could also be done with a postfix or even just a change in the prompt separator character i.e. going from a "#" to a ">" or some other character.) Note that the prefix does not need to be as short as shown in these examples. The prefix could be a text message that may include carriage returns or be sufficiently long to cause the display to wrap so that the command prompt takes more than one line on the display monitor. The text message could include specific identification of one or more of the most severe faults.

One embodiment of the present invention would simply have a binary system using a status prefix to indicate a fault and no status prefix when there are not any faults. In a preferred embodiment, further information such as the highest severity of the existing set of one or more fault conditions can also be communicated via the status prefix. For example, in a preferred embodiment, a status prefix of: "\*" indicates a "minor fault"; "**\*\*" indicates a "major fault"; and a "\*C" indicates a Critical fault condition. In this preferred embodiment, the status prefix 134 portion of the command line prompt 101 always displays the indication for the highest level fault condition that is currently present. For example, if both a Minor and Critical fault condition exists on the network element, then the command line prompt related to that network element will display the indicator for the presence of a Critical fault. As shown in FIG. 6, the likely response by the operator to the change in status prefix 134 is to enter a command 105 to get response 110** with additional details on the number and types of faults so that the operator can act to clear the fault or make other modifications to the communication network to adjust to the ongoing presence of the fault.

The system also works if autonomous messaging is turned off. (not shown) In this case however, the operator could enter one command without seeing the status condition, as the last command prompt visible on the screen would not necessarily show the current status of the network element (and with autonomous messaging turned off the operator would not see a pop-up message indicating the detection of a fault). After the operator hits the enter key, the next command line prompt would then show the current status for the network element through the use of a current status prefix. As it is normal for an operator to wait for the next prompt as an indication of command completion, the current status of the network element will be conveyed to the operator at the end of each "transaction" cycle (command entry and confirmation that the command was executed).

The present invention has been explained in the context of delivering a single piece of important status information about a network element through the use of a modified command line prompt. The command line prompt can be used to convey more than one piece of information by the use of more than one set of signals which could be concatenated together or otherwise combined. For example, a command line prompt including a character sequence of **\*\*-58-N could indicate that there is an unresolved major fault (\*\***), the network element is loaded to 58% of capacity, and the ambient temperature of the room storing the network element is within the normal range (ambient temperature might be of interest for a device monitored by an operator at a remote location).

While the present invention has been explained with the context of displaying information on a single network element, this does not preclude the use of this invention for a cluster of network elements that form a larger conceptual network element. For monitoring purposes, it may be useful for an operator to monitor these aggregated network elements to quickly learn of a cluster with a serious fault. If necessary, the operator can drill down to get more specific information on the specific fault and the specific component having difficulty. Thus, for the purposes of the claims that follow, the term network element includes network elements that are aggregations of related network elements.

While the present invention has been explained with the use of character based indicators, one of skill in the art could implement a series of command line prompts wherein the choice of prompt conveys information about the status of a network element and do so with non-character based indicators. For example, changing the prompt to bright red for a critical fault and yellow for a less series fault would be an option. Likewise, changing the normal font to italics, underlined, and finally bold or bold and all capital letters would be another way of conveying current status information. A more subtle set of indications would be using no capital letters for one status, leading caps for a second status, and all caps or reverse caps for a more urgent status. Other command prompt appearance attributes that could be used to convey information include choice off character font set, font size, blinking/non-blinking, and background color of prompt as opposed to the foreground color used for the text. The preferred embodiment uses characters including capitalization schemes rather then the other various appearance attributes as character based cues can be implemented in a wide range of systems on a wide range of legacy displays without the use of escape characters and without complication to the logging of the command line status information.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

Acronyms and Abbreviations

| | |
|---|---|
| CLI | Command Line Interface |
| CRT | Cathode Ray Tube |

We claim:

1. A method of conveying status information in a command prompt used in a system to monitor the performance of a particular network element of a communication network, the method comprising:
   a) categorizing various fault conditions for the network element into classes based on severity;
   b) assigning a fault class indicator to each fault severity class;
   c) modifying the command prompt to incorporate the fault class indicator for the most severe fault severity class with a current fault condition;
   d) using the modified command prompt on a scrolling display screen used by an operator monitoring the performance of the particular network element; and
   e) iteratively repeating steps c–d before each subsequent display of the command prompt.

2. The method of claim 1 wherein the modification to the command prompt uses a prefix to indicate the most severe fault severity class.

3. The method of claim 2 wherein the prefix of the command prompt includes a text message so that the command prompt is more than one line on the scrolling display screen.

4. The method of claim 1 wherein the modification to the command prompt uses a change in a command prompt separator from a first character to a second character to indicate a change in level of the most severe fault severity class with at least one current fault.

5. The method of claim 1 wherein the modification to the command prompt modifies appearance attributes of displayed text of the command prompt using an appearance attribute selected from the group consisting of character font set, font size, bold/no bold, underline/no underline, italics/no italics, blinking/non-blinking, capitalization scheme, foreground color, and background color.

6. The method of claim 1 wherein the modification to the command prompt is also used as a modification to pop-up messages, whereby the status information of the network element is conveyed with a pop-up message conveying an event to the scrolling display screen.

7. The method of claim 1 wherein the command prompt is sent to a location remote from the network element so that the network element can be monitored by an operator and the initial command prompt sent at the start of a remote monitoring session includes status information concerning an event that occurred before the start of the remote monitoring session.

8. A method of conveying status information in a command prompt used in a system to monitor the performance of a particular network element of a communication network, the method comprising:
   a) modifying the command prompt to incorporate status information regarding the network element;
   b) using the modified command prompt on a scrolling display screen used by an operator monitoring the performance of the particular network element; and
   c) iteratively repeating steps a-b before each subsequent display of the command prompt.

9. The method of claim 8 wherein the step of modifying the command prompt to incorporate status information regarding the network element includes the sub-step of changing a first portion of the command prompt to indicate a current state of a first status metric and changing a second portion of the command prompt to indicate the current state of a second status metric.

10. The method of claim 8 wherein the command prompt is modified to incorporate status information about a state of the network element for a state reached by the network element before an establishment of a remote monitoring session whereby the operator is provided an indication of this particular state of the network element with a first command prompt of the remote monitoring session.

11. A method of providing repeated status indication of a current status of a network element in a network communication system, the method comprising:
    using a first command line prompt on any display used for monitoring the current status of the network element, the use of the first command line prompt indicating a current fault of severity level 1 for the network element;

using a second command line prompt, distinguishable from the first command line prompt, on any display used for monitoring the current status of the network element, the use of the second command line prompt indicating that there is not a current fault of severity level 1 for the network element, but there is at least one current fault of severity level 2 for the network element; and using a third command line prompt, distinguishable from both the first command line prompt and the second command line prompt, on any display used for monitoring the current status of the network element, the use of the third command line prompt indicating a lack of any current detected faults of severity level 1 for the network element and also indicating the lack of any current detected faults of severity level 2 for the network element.

12. The method of claim 11 wherein the first command line prompt uses a first command line prompt prefix; and the second command line prompt uses a second command line prompt prefix, distinguishable from the first command line prompt prefix.

13. The method of claim 12 wherein the first command line prompt prefix includes a first text message so that the first command line prompt is more than one line on the display; and the second command line prompt uses a second text message, distinguishable from the first text message.

14. The method of claim 11 wherein the first command line prompt uses a first command line prompt separator and the second command line prompt uses a second command line prompt separator, distinguishable from the first command line prompt separator.

15. The method of claim 11 wherein the differences between the first command line prompt and the second command line prompt include a difference in at least one appearance attribute selected from the group consisting of character font set, font size, bold/no bold, underline/no underline, italics/no italics, blinking/non-blinking, foreground color, and background color.

16. The method of claim 11 wherein:

while the network element has a fault of severity level 1, subsequently displayed pop-up messages are in a first format; and while the network element does not have a fault of severity level 1 but has a fault of severity level 2, subsequently displayed pop-up messages are of a second format, distinguishable from the first format, whereby the current status of the network element is conveyed with a new pop-up message conveying an event to the display.

17. The method of claim 11 wherein a set of command prompt is sent to a location remote from the network element so that the network element can be monitored by an operator and an initial command prompt sent at the start of a remote monitoring session is the first command line prompt indicating a fault of severity level 1 for the network element for an ongoing fault that was first detected before the start of the remote monitoring session whereby a remote monitoring session started too late to receive a message announcing the detection of the ongoing fault is provided an indication of an existence of the ongoing fault.

* * * * *

UNITED STATES PATENT AND TRADEMARK OFFICE
CERTIFICATE OF CORRECTION

PATENT NO. : 7,069,512 B2  Page 1 of 1
APPLICATION NO. : 10/266909
DATED : June 27, 2006
INVENTOR(S) : Harvey et al.

It is certified that error appears in the above-identified patent and that said Letters Patent is hereby corrected as shown below:

Column 6
  Line 33, "the initial" should be --an initial--.
  Line 53, "the current" should be --a current--.

Column 8
  Line 23, "prompt" should be --prompts--.

Signed and Sealed this

Twenty-first Day of November, 2006

JON W. DUDAS
*Director of the United States Patent and Trademark Office*